UNITED STATES PATENT OFFICE.

ALBERT W. SMITH, OF CLEVELAND, OHIO.

PROCESS OF EXTRACTING BROMIN.

SPECIFICATION forming part of Letters Patent No. 725,161, dated April 14, 1903.

Application filed April 12, 1902. Serial No. 102,540. (No specimens.)

*To all whom it may concern:*

Be it known that I, ALBERT W. SMITH, a citizen of the United States, and a resident of Cleveland, county of Cuyahoga, and State of Ohio, have invented a new and useful Improvement in Processes of Extracting Bromin, of which the following is a specification, the principle of the invention being herein explained and the best mode in which I have contemplated applying that principle, so as to distinguish it from other inventions.

My invention relates to methods of converting free bromin into bromid and bromate, its object being to effect such formation in a manner more economical than any other of which I have knowledge and heretofore employed.

Said invention consists of steps hereinafter fully described, and particularly set forth in the claims.

The following description sets forth in detail one mode of carrying out the invention, such disclosed mode constituting but one of various ways in which the principle of the invention may be used.

In methods heretofore employed for forming bromids and bromates from free bromin bromin-laden air is passed through a coke or similar tower and brought into contact with a solution of an alkaline carbonate and water, such as potassium carbonate, ($K_2CO_3$,) the following reaction taking place:

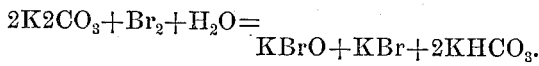

When this normal carbonate is nearly all converted as per above reaction, the large excess of air passing dissociates the $KHCO_3$ into $K_2CO_3$, $H_2O$, and $CO_2$. This reaction takes place freely only when the proportion of $CO_2$ in the air is small. The air containing any uncombined bromin and the $CO_2$ passing out of the tower is conducted into and through the source of bromin back into the tower, together with the fresh supply of bromin-laden air from said source, and the same reactions take place, the $CO_2$, however, combining with the normal carbonate to form the bicarbonate $KHCO_3$ and upon which bromin has no action, a large part of the normal carbonate being thus rendered inactive.

In my improved method I pass the exit gases containing any unabsorbed Br and the liberated $CO_2$ through some form of apparatus designed to bring the gases into intimate contact with the hydrate or oxid of an alkali or alkaline earth, such as calcium oxid or calcium hydrate, either alone or mixed with water. These oxids or hydrates combine with the free $CO_2$ and Br, thereby saving the latter and so freeing the air from $CO_2$ that it exerts a maximum dissociating effect on the $NaHCO_3$, when the air is again returned to the absorbing-tower after taking up a new supply of Br. The reaction is as follows:

the $CO_2$ thus formed being absorbed and removed in a separate absorbing apparatus, as above described. The incoming bromin-laden air practically free from $CO_2$ effects the following reaction:

Two results are thus accomplished—the saving of any Br that may be carried out of the first absorbing apparatus and the nearly complete conversion of the $K2CO_3$ into $KBrO$ and KBr.

Other modes of applying the principle of my invention may be employed instead of those explained, change being made as regards the method herein disclosed, provided the step or steps described in any one of the following claims or the equivalent of such stated step or steps be employed.

I claim—

1. The steps in the process of extracting bromin which consist in treating a bromin-laden gas to the action of an alkaline carbonate and then subject the resultant gases to the action of an absorbent for carbon dioxid.

2. The steps in the process of extracting bromin which consist in treating a bromin-laden gas to the action of an alkaline carbonate and then subjecting the resultant gases to the action of an alkaline-earth compound.

3. The steps in the process of extracting bromin which consist in treating bromin-laden gas to the action of potassium carbonate and subjecting the resultant gases to the action of an absorbent for carbon dioxid.

4. The steps in the process of extracting bromin, which consist in treating bromin-laden gas to the action of potassium of carbonate and then subjecting the resultant gases to the action of an alkaline-earth hydrate.

Signed by me this 28th day of March, 1902.

ALBERT W. SMITH.

Attest:
D. T. DAVIES,
A. E. MERKEL.